United States Patent
Heller et al.

(10) Patent No.: US 10,225,249 B2
(45) Date of Patent: Mar. 5, 2019

(54) PREVENTING UNAUTHORIZED ACCESS TO AN APPLICATION SERVER

(71) Applicant: GreyHeller, LLC, San Ramon, CA (US)

(72) Inventors: Chris Heller, San Ramon, CA (US); Larry Grey, San Ramon, CA (US)

(73) Assignee: GreyHeller, LLC, San Ramon, CA (US)

(*) Notice: Subject to any disclaimer, the term of this patent is extended or adjusted under 35 U.S.C. 154(b) by 313 days.

(21) Appl. No.: 14/539,984

(22) Filed: Nov. 12, 2014

(65) Prior Publication Data

US 2016/0050205 A1    Feb. 18, 2016

Related U.S. Application Data

(63) Continuation-in-part of application No. 14/195,659, filed on Mar. 3, 2014, which is a continuation-in-part
(Continued)

(51) Int. Cl.
*G06F 17/00* (2006.01)
*H04L 29/06* (2006.01)
*G06F 21/62* (2013.01)

(52) U.S. Cl.
CPC ............ *H04L 63/10* (2013.01); *G06F 21/629* (2013.01); *G06F 21/6245* (2013.01);
(Continued)

(58) Field of Classification Search
CPC ...................................................... G06F 21/62
See application file for complete search history.

(56) References Cited

U.S. PATENT DOCUMENTS

| 6,341,316 B1 | 1/2002 | Kloba et al. |
| 6,510,468 B1 | 1/2003 | Hayne |

(Continued)

FOREIGN PATENT DOCUMENTS

| EP | 1398692 A2 | 3/2004 |
| EP | 2831697    | 2/2015 |

(Continued)

OTHER PUBLICATIONS

Search Report dated Jun. 9, 2016 6803UK Application No. 1519982. 1, 3 pages.

(Continued)

*Primary Examiner* — Scott T Baderman
*Assistant Examiner* — Barbara M Level
(74) *Attorney, Agent, or Firm* — Carr & Ferrell LLP

(57) ABSTRACT

A method and platform for preventing unauthorized access to an application server comprises collecting access data associated with an organization, anonymizing the access data, creating identifying keys which allow the anonymized access data to be matched to its associated users, storing the identifying keys at a secure location associated with the organization, transferring the anonymized access data to an access data warehouse, and performing an analysis on the anonymized access data. The access data warehouse can be maintained in a cloud computing environment, and may aggregate anonymized access data from a plurality of organizations. An organization may detect abnormal usage patterns by analyzing its usage data and the anonymized usage data of further organizations, and may use the abnormal usage patterns to predict future events, for example intrusion attempts. An organization can automatically generate protective measures against potential threats associated with abnormal usage patterns.

21 Claims, 6 Drawing Sheets

Related U.S. Application Data of application No. 13/430,566, filed on Mar. 26, 2012, now abandoned.

(60) Provisional application No. 61/901,331, filed on Nov. 7, 2013.

(52) U.S. Cl.
CPC .. *G06F 21/6263* (2013.01); *G06F 2221/2101* (2013.01); *G06F 2221/2141* (2013.01); *H04L 2463/082* (2013.01)

(56) References Cited

U.S. PATENT DOCUMENTS

| | | | |
|---|---|---|---|
| 6,721,713 B1 | 4/2004 | Guheen et al. | |
| 6,807,569 B1* | 10/2004 | Bhimani | G06F 21/577 |
| | | | 705/44 |
| 7,197,041 B1 | 3/2007 | Tyebji | |
| 7,318,066 B2 | 1/2008 | Kaufman et al. | |
| 7,366,900 B2* | 4/2008 | Shambroom | G06F 21/41 |
| | | | 380/279 |
| 7,613,810 B2 | 11/2009 | Romero et al. | |
| 7,831,904 B2 | 11/2010 | Kim | |
| 8,032,567 B2 | 10/2011 | Schemer et al. | |
| 8,196,062 B2 | 6/2012 | Sylthe et al. | |
| 8,627,226 B2 | 1/2014 | Bates et al. | |
| 8,706,802 B1 | 4/2014 | Dayan et al. | |
| 8,862,777 B2 | 10/2014 | Panidepu et al. | |
| 9,015,578 B2 | 4/2015 | Cooper et al. | |
| 9,152,802 B2 | 10/2015 | Saraf et al. | |
| 9,245,291 B1 | 1/2016 | Ballaro et al. | |
| 2002/0049858 A1 | 4/2002 | Frietas et al. | |
| 2002/0073235 A1 | 6/2002 | Chen et al. | |
| 2002/0083411 A1 | 6/2002 | Bouthors et al. | |
| 2002/0103881 A1 | 8/2002 | Granade et al. | |
| 2003/0058277 A1 | 3/2003 | Bowman-Amuah | |
| 2004/0073565 A1 | 4/2004 | Kaufman et al. | |
| 2004/0133848 A1 | 7/2004 | Hunt et al. | |
| 2005/0114435 A1 | 5/2005 | DiPlacido et al. | |
| 2005/0183021 A1 | 8/2005 | Allen et al. | |
| 2006/0031870 A1 | 2/2006 | Jarman et al. | |
| 2006/0253894 A1 | 11/2006 | Bookman et al. | |
| 2007/0043837 A1 | 2/2007 | Kruse et al. | |
| 2007/0053367 A1 | 3/2007 | Tyebji | |
| 2007/0067338 A1 | 3/2007 | Koizumi et al. | |
| 2007/0100834 A1 | 5/2007 | Landry et al. | |
| 2007/0174291 A1 | 7/2007 | Cooper et al. | |
| 2008/0195934 A1 | 8/2008 | Kim | |
| 2009/0064105 A1 | 3/2009 | Lo et al. | |
| 2009/0083643 A1 | 3/2009 | Beringer | |
| 2009/0183244 A1 | 7/2009 | Saraf et al. | |
| 2009/0249290 A1 | 10/2009 | Jenkins et al. | |
| 2010/0083163 A1 | 4/2010 | Maghoul et al. | |
| 2010/0262678 A1 | 10/2010 | Morgan et al. | |
| 2010/0313009 A1* | 12/2010 | Combet | G06Q 30/0204 |
| | | | 713/150 |
| 2011/0041048 A1 | 2/2011 | Schemer et al. | |
| 2011/0072359 A1 | 3/2011 | So et al. | |
| 2011/0099467 A1 | 4/2011 | Kapur et al. | |
| 2011/0131325 A1 | 6/2011 | Piccionelli et al. | |
| 2011/0252147 A1 | 10/2011 | Ewe et al. | |
| 2011/0252160 A1 | 10/2011 | Wu | |
| 2011/0276585 A1 | 11/2011 | Wagner et al. | |
| 2012/0072985 A1* | 3/2012 | Davne | H04L 63/0272 |
| | | | 726/22 |
| 2012/0110067 A1 | 5/2012 | Birsa et al. | |
| 2012/0239785 A1 | 9/2012 | Pazos | |
| 2013/0031464 A1 | 1/2013 | Mess | |
| 2013/0074142 A1 | 3/2013 | Brennan et al. | |
| 2013/0097490 A1 | 4/2013 | Kotler et al. | |
| 2013/0159021 A1* | 6/2013 | Felsher | G06F 19/328 |
| | | | 705/3 |
| 2013/0212484 A1 | 8/2013 | Joshi et al. | |
| 2013/0212486 A1 | 8/2013 | Joshi et al. | |
| 2013/0253904 A1 | 9/2013 | Heller et al. | |
| 2014/0351102 A1 | 11/2014 | Jolliffee et al. | |
| 2015/0128124 A1 | 5/2015 | Grey et al. | |
| 2015/0269390 A1* | 9/2015 | Schaefer | G06F 21/6218 |
| | | | 707/781 |
| 2016/0364219 A9 | 12/2016 | Grey et al. | |

FOREIGN PATENT DOCUMENTS

| | | | |
|---|---|---|---|
| EP | 3066587 A1 | 9/2016 | |
| EP | 2831697 B1 | 10/2017 | |
| FR | 2849561 A1 | 7/2004 | |
| GB | 2535579 A | 8/2016 | |
| WO | WO2002014987 A2 * | 8/2001 | |
| WO | WO2002023366 A1 | 3/2002 | |
| WO | WO 2011023664 A2 * | 3/2011 | G06F 21/316 |
| WO | WO2013148098 | 10/2013 | |
| WO | WO2014138115 A1 | 9/2014 | |
| WO | WO2015069429 A1 | 5/2015 | |

OTHER PUBLICATIONS

Extended European Search Report dated Apr. 23, 2015 5984EP Application No. 13767589.8.

International Search Report dated May 20, 2013 5984PCT Application No. PCT/US2013/029446.

International Search Report dated Feb. 5, 2015 6615PCT Application No. PCT/US2014/060779.

"EnterpriseSoftware," Wikipedia, the Free Encyclopedia [online], Retrieved on Jan. 30, 2017, Retrieved from the Internet: URL:https://en.wikipedia.org/wiki/Enterprise_Software>, 1 page.

Non-Final Office Action, dated Feb. 7, 2017, U.S. Appl. No. 13/430,566, filed Mar. 26, 2012.

Final Office Action, dated May 13, 2016, U.S. Appl. No. 14/195,659, filed Mar. 3, 2014.

Final Office Action, dated Jun. 29, 2016, U.S. Appl. No. 13/430,566, filed Mar. 26, 2012.

Final Office Action, dated Aug. 21, 2017, U.S. Appl. No. 14/195,659, filed Mar. 3, 2014.

Advisory Action, dated Sep. 21, 2017, U.S. Appl. No. 13/430,566, filed Mar. 26, 2012.

"Intention to Grant," European Patent Application No. 13767589.8, dated Apr. 6, 2017, 7 pages.

"Extended European Search Report," European Patent Application No. 14859509.3, dated Jun. 1, 2017, 7 pages.

Non-Final Office Action, dated Apr. 17, 2017, U.S. Appl. No. 14/195,659, filed Mar. 3, 2014.

Final Office Action, dated Jun. 9, 2017, U.S. Appl. No. 13/430,566, filed Mar. 26, 2012.

Lakshman, T. K. et al., "Enhancing Enterprise Field Productivity via Cross Platform Mobile Cloud Apps," Proceeding of the Second International Workshop on Mobile Cloud Computing and Services, Jun. 28, 2011, pp. 27-32.

Balakrishnan, D. et al., "Adaptive Context Monitoring in Heterogeneous Environments," International Conference on Network and Service Management, 2010, pp. 422-425.

\* cited by examiner

PREVENTING UNAUTHORIZED ACCESS TO AN APPLICATION SERVER

CROSS-REFERENCE TO RELATED APPLICATIONS

This application is a continuation-in-part of and claims the priority benefit of U.S. patent application Ser. No. 13/430,566 filed on Mar. 26, 2012, and entitled "Client Specific Interactions with Enterprise Software Systems," and U.S. patent application Ser. No. 14/195,659 filed Mar. 3, 2014, and entitled "Dynamically Optimized Content Display," which in turn claims the priority benefit of U.S. Provisional Patent Application Ser. No. 61/901,331 filed Nov. 7, 2013, and entitled "Dynamically Optimized Content Display for Mobile Devices and Security Plugins". All of the above disclosures are hereby incorporated by reference in their entirety.

TECHNICAL FIELD

This disclosure relates generally to data processing, and more particularly, to preventing unauthorized access to application servers.

BACKGROUND

Application servers can be vulnerable to many types of unauthorized access by both authorized users and intruders. Perpetrators of unauthorized access continually develop new tools and strategies for circumventing access controls, making prevention of unauthorized access a constant challenge. Embodiments of the present disclosure are directed to making unauthorized access to application servers easier to predict, detect, and prevent.

SUMMARY OF THE DISCLOSURE

This summary introduces the present disclosure in a simplified form that is further described in the Detailed Description below. This summary is not intended to identify essential features of the present disclosure, nor is it intended for use as an aid in determining the scope of the claimed subject matter.

In one example embodiment, a method for preventing unauthorized access to an application server is disclosed. The application server can operate within an application environment associated with an organization. The application server can collect access data associated with accesses to the application server by its users. The access data can be anonymized, making certain parts of the access data unidentifiable without matching identifying keys. At least one such identifying key can be created with which the anonymized parts of the anonymized access data can be reidentified.

The anonymized access data can be transferred to an access data warehouse in a remote computing environment. The identifying keys can be retained at a secure location within the application environment. A plurality of organizations can transfer anonymized access data to the access data warehouse in the manner described above. The anonymized access data can be aggregated in the access data warehouse. Each organization can have access to only its own identifying keys, and thus can reidentify only its own anonymized access data when it retrieves anonymized access data from the access data warehouse.

An analysis of the anonymized access data can be performed to identify abnormal usage patterns in the anonymized access data associated with that application's application server. The analysis can further generate protective measures adapted to protect that organization's application server from unauthorized access. The analysis can utilize the organization's identifying keys to reidentify the anonymized access data associated with that organization. Because the organization does not have access to other organizations' identifying keys, it cannot reidentify the anonymized access data associated with other organizations. Thus the analysis for that organization can utilize all of the organizations' anonymized access data without compromising the security of any other organization. By utilizing anonymized access data associated with a plurality of organizations, the analysis may be better able to identify patterns and trends that affect many organizations, such as emerging security threats.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
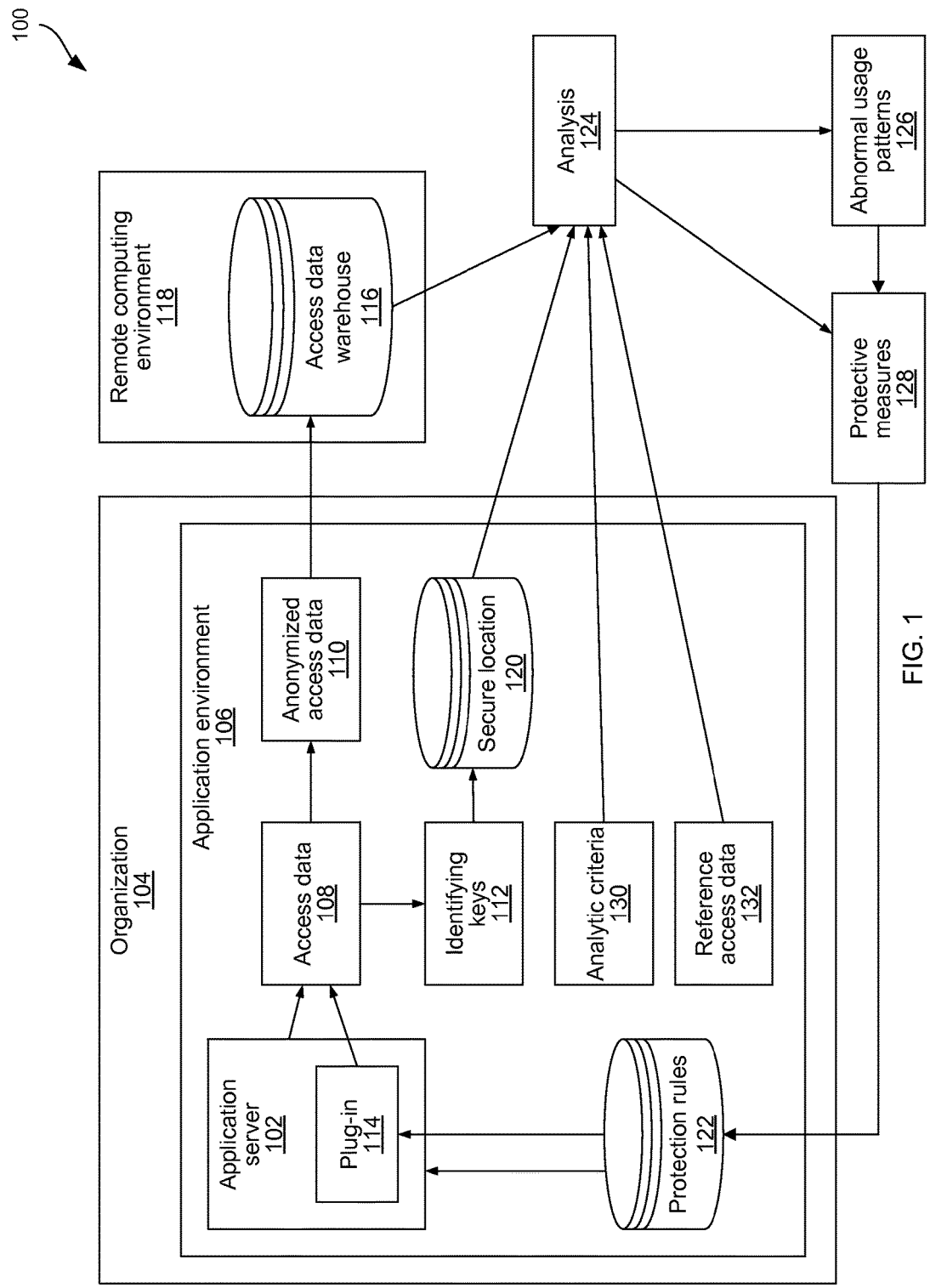
FIG. 1 illustrates a method for preventing unauthorized access to an application server.

FIG. 1 illustrates an example method 100 for preventing unauthorized access to an application server. An application server 102 associated with an organization 104 can run in an application environment 106. The application server 102 can collect access data 108 associated with accesses to the application server 102 by its users. The access data 108 can be anonymized, creating anonymized access data 110 and at least one identifying key 112.

The anonymized access data 110 can omit an accessible form of at least one type of information contained in the access data 108. The information contained in the access data 108 that is omitted in accessible form from the anonymized access data 110 can be referred to as "anonymized information." The anonymized information can be recovered by reference to the anonymized access data 110 and the identifying keys 112. The operation of recovering the anonymized information can be referred to as "identifying" the anonymized access data 110.

The anonymized information can include the identity of at least one user of the application server 102. By reidentifying the anonymized access data 110 it can be possible to match each record in the anonymized access data to the associated user. The anonymized information may include further types of information, for example, the identity of the application server 102, and keys or other identifying characteristics of data being requested from the application server 102. In some embodiments the access data 108 can be collected by a plug-in 114 installed on the application server 102.

The anonymized access data 110 can be transferred to an access data warehouse 116, located in a remote computing environment 118, which may include a cloud computing environment. The identifying keys 112 can be stored at a secure location 120 within the application environment 106. Protection rules 122 can govern the operation of the application server 102 or the plug-in 114 or both. The protection rules 122 can implement security policies, for example, determining the operations that various users are allowed to perform, and limiting access to the application server 102 from certain IP addresses.

An analysis 124 can be performed on the anonymized access data 110. The analysis 124 can identify at least one abnormal usage pattern 126, and can further generate at least one protective measure 128. The analysis 124 can utilize the identifying keys 112 to reidentify the anonymized access data 110. The analysis 124 can be governed by at least one analytic criterion 130. The analysis 124 can be performed automatically or on demand. The protective measures 128 can include both human-readable results such as messages, alerts, and reports, and modifications to the protection rules 122. Modifications to the protection rules 122 can be applied automatically, or may be proposed for approval by an authorized agent of the organization 104. In some embodiments the analysis 124 occurs in the remote computing environment 118, which may include a cloud computing environment.

In some embodiments, the access data 108 includes one or more of a request, a log-in, a user location, a user name, a role, a content, a header of a data package, a data attribute, an activity associated with content, an activity associated with a type of user, a multi-factor authentication activity, a user identification (ID), an IP address, a browser type, a date, a time, a login page, a portal content, an employee ID, an action taken, a script run, and a response. In some embodiments, the anonymized access data 110 stored in the access data warehouse 116 is formatted prior to the analysis 124. In some embodiments, the analytic criteria 130 can include a data mining algorithm.

In some embodiments, the analysis 124 can be performed in the remote computing environment 118. In some embodiments, the analysis 124 includes comparing the anonymized access data 110 to reference access data 132 which represent events and patterns that the analysis 124 is to recognize in the anonymized access data 110. Events represented by the reference access data 132 may include user operations, user requests, user IDs, IP address, and any other type of information contained in the anonymized access data 110. Patterns represented by the reference access data 132 can include any combination of two or more pieces of information in the anonymized access data 110, such as a user account sending requests from an IP address that is remote from the account user's usual location, or a user account accessing a specified type of sensitive data more frequently than it historically has done.

The abnormal usage patterns 126 may include one or more of: a security breach, a threat, at least two segregated users interacting in a single online process, the interacting users having different roles which are intended to enforce segregation of duties with respect to the online process, a payee and a payer accessing the application server 102 from the same IP address, at least two users accessing the application server 102 from different locations with the same credentials, a failed login request, abnormally formatted data, and an attack from an IP address.

In some embodiments, protective measures 128 include protective measures which modify the protection rules 122. For example, if one of the abnormal usage patterns 126 represents a payee and payer accessing the application server 102 from the same IP address, a protective measure 128 can modify the protection rules 122 to temporarily or permanently block one or both users from access. In some embodiments, the analysis 124 includes predicting at least one future event, for example an intrusion attempt, based on the abnormal usage patterns 126. The predictions may be reported in the protective measures 128.

Figure 2:
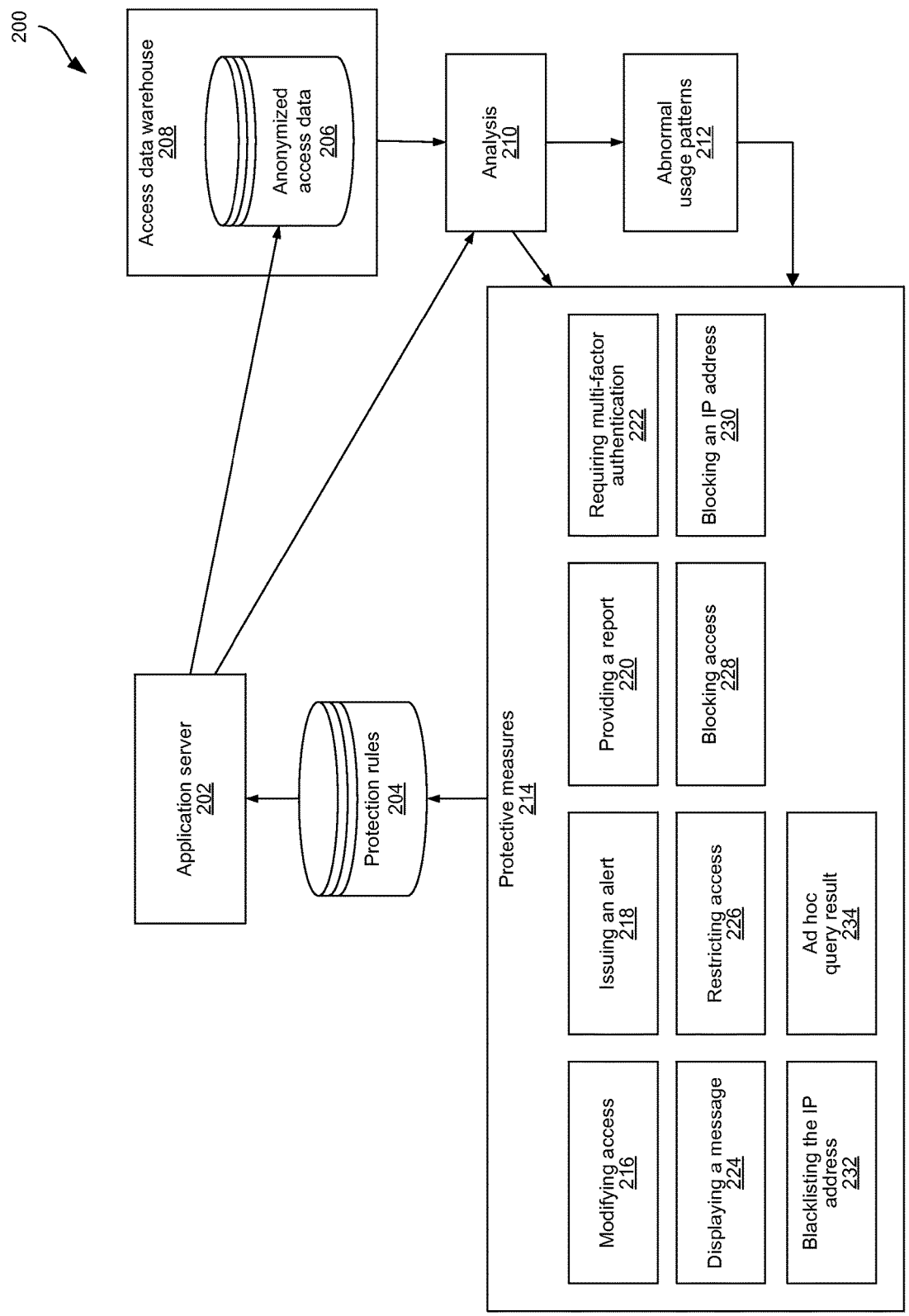
FIG. 2 illustrates a method for preventing unauthorized access to an application server in which application servers associated with several organizations store anonymized access data in an access data warehouse located in a remote computing environment.

FIG. 2 shows certain aspects of the example embodiment of FIG. 1 in more detail. In the method 200, an application server 202 can collect and anonymize access data, creating anonymized access data 206, which is stored in an access data warehouse 208. The operation of the application server 202 can be subject to a set of protection rules 204 which implement security policies. An analysis 210 can identify at least one abnormal usage pattern 212, which may be used to generate at least one protective measure 214. The protective measures 214 can include both human-readable results such as messages, alerts, reports, and modifications to the protection rules 204. Modifications to the protection rules 204 can be applied automatically, or can be proposed for approval by an authorized agent of the organization 104.

The protective measures 214 can include at least one of the following: automatically modifying access 216, issuing an alert 218, providing a report 220, requiring multi-factor authentication 222, displaying a message 224, restricting access 226, blocking access 228, blocking an Internet Protocol (IP) address 230, blacklisting the IP address 232, and generating an ad hoc query result 234.

Figure 3:
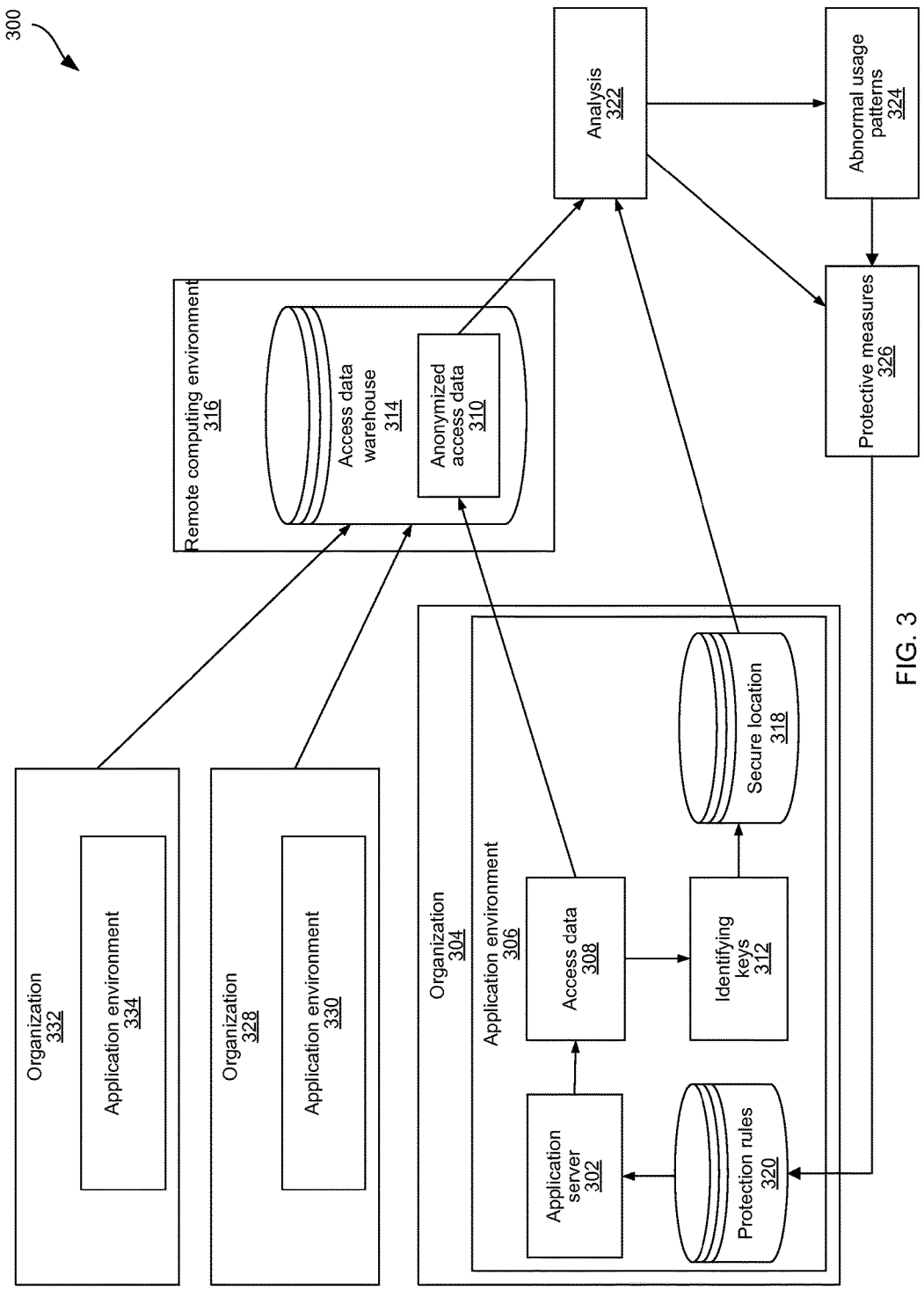
FIG. 3 shows a platform for preventing unauthorized access to an application server.

FIG. 3 shows further aspects of the example embodiment of FIG. 1. In the method 300, an application server 302 associated with an organization 304 can run in an application environment 306. The application server 302 can collect access data 308. The access data 308 can be anonymized, creating anonymized access data 310 and at least one identifying key 312. The anonymized access data 310 can be transferred to an access data warehouse 314, located in a remote computing environment 316, which can include a cloud computing environment. The identifying keys 312 can be stored at a secure location 318 within the application environment 306.

Protection rules 320 can govern the operation of the application server 302. The protection rules 320 can implement security policies, for example, determining the operations that various users are allowed to perform, and limiting access to the application server 302 from certain IP addresses. An analysis 322 performed for the organization 304 can identify at least one abnormal usage pattern 324 associated with the application server 302, which can be used to generate at least one protective measure 326 for the organization 304.

Organizations 328, 332 can represent a plurality of further organizations that use the method 300. Organizations 328, 332 can maintain application environments 330, 334. It should be understood that the application environments 330, 334 include components which correspond to the components 302, 308, 310, 312, 318, 320 of application environment 306, although those components are not shown in FIG. 3. An analysis 322 performed for any particular one of the further organizations 328, 332 can selectively identify the abnormal usage patterns 324 associated with that particular further organization's application server, which can be used to generate protective measures 326 for that particular further organization.

The anonymized access data 310 associated with the organization 304 and the plurality of further organizations 328, 332 can be aggregated in the access data warehouse 314 in such a way that all of the anonymized access data 310 is available to the analysis 322 for the organization 304.

When the analysis 322 is performed for the organization 304 it can utilize all of the anonymized access data 310, but it can utilize only the identifying keys 312 associated with the organization 304, and thus can reidentify only that part of the anonymized access data 310 which is associated with organization 304. The analysis 322 performed for the organization 304 thus can utilize all of the anonymized access data 310 without compromising the security of any of the further organizations 328, 332. The analysis 322, by utilizing anonymized access data 310 associated with a plurality of organizations, may be better able to identify patterns and trends that affect many organizations, such as emerging security threats.

Similarly, when the analysis 322 is performed for any particular one of the further organizations 328, 332, the analysis 322 can utilize all of the anonymized access data 310 in the access data warehouse 314, but can utilize only the identifying keys associated with that particular further organization, and thus can reidentify only that part of the anonymized access data 310 which is associated with that particular further organization. The analysis 322 can be performed for that particular further organization thus can utilize all of the anonymized access data 310 without compromising the security of any of the further organizations 328, 332.

Figure 4:
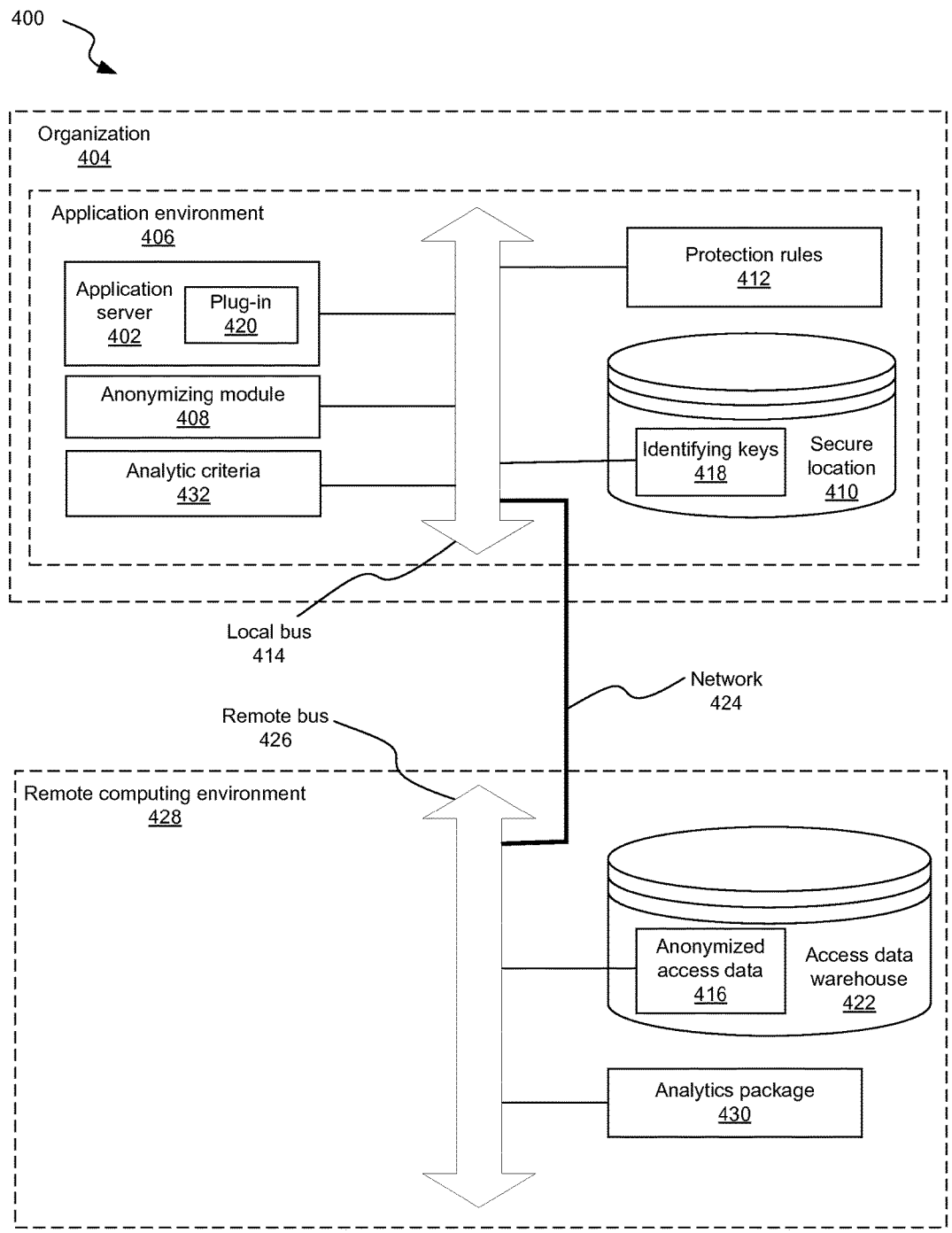
FIG. 4 shows a platform for preventing unauthorized access to an application server in which application servers associated with several organizations store anonymized access data in an access data warehouse located in a remote computing environment.

FIG. 4 shows the components of one embodiment of an unauthorized access prevention platform 400 for preventing unauthorized access to an application server according to the present disclosure. An application server 402 associated with an organization 404 can run in an application environment 406 and communicate with an anonymizing module 408, a secure location 410, and a set of protection rules 412 through a local bus 414. Access data may be collected by the application server 402 and anonymized by the anonymizing module 408, creating anonymized access data 416 and at least one identifying key 418 for the anonymized access data 416. The identifying keys 418 can be used to reidentify the anonymized access data 416.

Anonymized information in the anonymized access data 416 can include data related to the users associated with the access data. The identifying keys 418 can be used to match the anonymized access data to its associated users. In some embodiments the access data can be collected by a plug-in 420 which is installed on the application server 402. The anonymized access data 416 can be transferred to an access data warehouse 422 through a network connection 424 which is communicatively coupled to the local bus 414 and a remote bus 426. The access data warehouse 422 and the remote bus 426 can be located in a remote computing environment 428, which may include a cloud computing environment. The identifying keys 418 can be stored at a secure location 410 associated with the organization 404.

The protection rules 412, accessible through the local bus 414, can govern the operation of the application server 402 or the plug-in 420 or both. The protection rules 412 can implement security policies, for example, determining the operations that various users are allowed to perform, and limiting access to the application server 402 from certain IP addresses.

At least one analytics package 430 is connected to the remote bus 426. The at least one analytics package 430 may be located in the remote computing environment 428. The at least one analytics package 430 is operable to analyze the anonymized access data 416 and the identifying keys 418. The operation of the at least one analytics package 430 may be governed by at least one analytic criterion 432 associated with the organization 404. The at least one analytics package 430 may perform various analytic functions automatically or on demand.

The at least one analytics package 430 can further generate at least one protective measure adapted to protect the application environment 406 against the abnormal usage patterns identified by the at least one analytics package 430. The protective measures generated by the at least one analytics package 430 can include both human-readable results such as messages, alerts, and reports, and modifications to the protection rules 412. Modifications to the protection rules 412 can be applied automatically, or can be proposed for approval by an authorized agent of the organization 404.

Protective measures generated by the analytics package 430 can include one or more of the following: automatically modifying access, issuing an alert, providing a report, requiring multi-factor authentication, displaying a message, restricting access, blocking access, blocking an Internet Protocol (IP) address, blacklisting the IP address, and generating an ad hoc query result.

Figure 5:
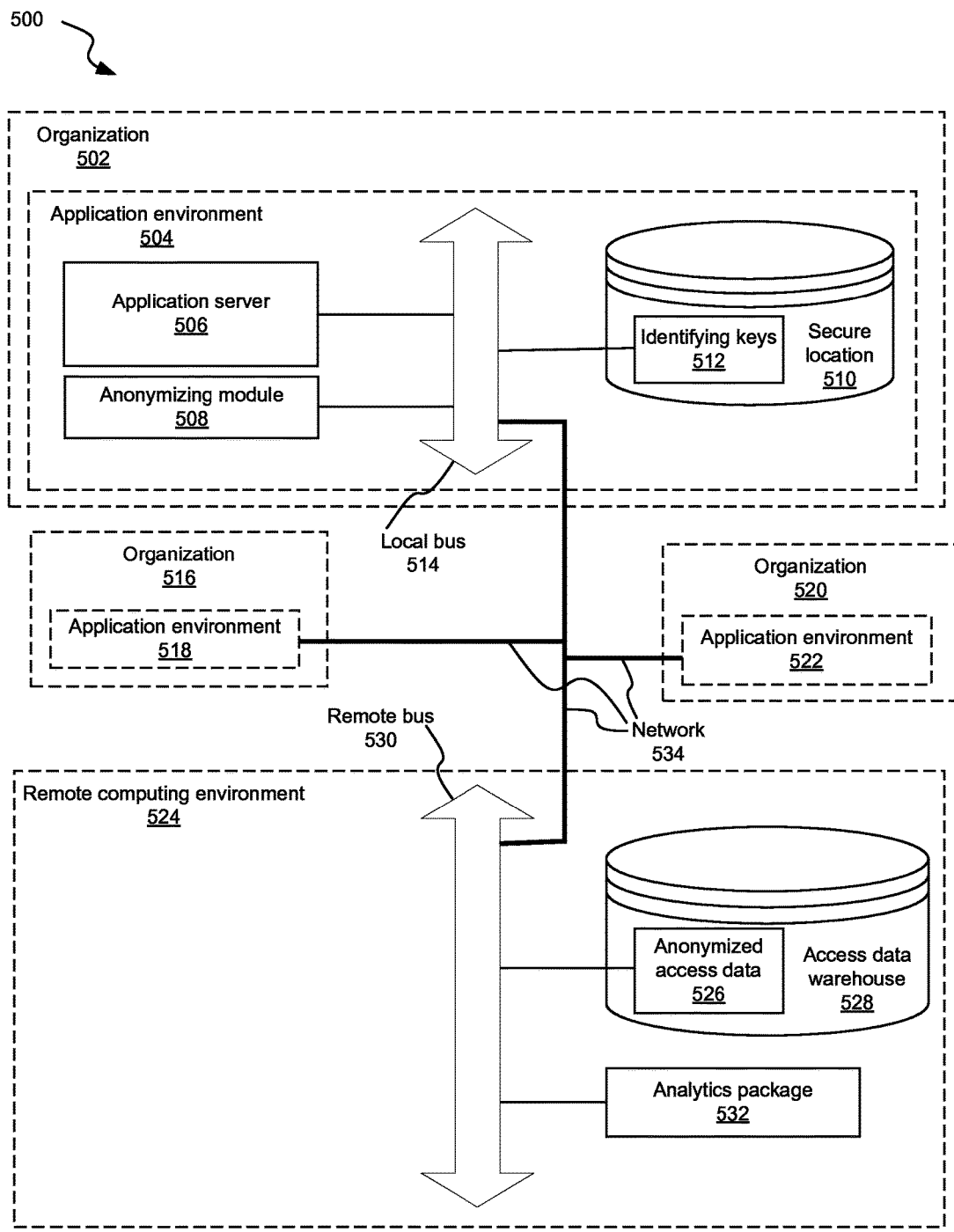
FIG. 5 illustrates a method of taking protective measures in response to abnormal usage patterns.

FIG. 5 shows certain aspects of the example embodiment of FIG. 4 in more detail. The platform 500, the organization 502, and the application environment 504 can correspond to the unauthorized access prevention platform 400, the organization 404, and the application environment 406 of FIG. 4. The application server 506, the anonymizing module 508, the secure location 510, the identifying keys 512, and the local bus 514 can correspond to the application server 402, the anonymizing module 408, the secure location 410, the identifying keys 418, and the local bus 414 of FIG. 4. It should be understood that the application environment 504 can include components corresponding to all of the components of the application environment 406 of FIG. 4, although some of those components are not shown in FIG. 5.

The organizations 516, 520 can represent a plurality of further organizations that share the platform 500, each of which can correspond to the organization 404 of FIG. 4. The application environments 518, 522 can correspond to the application environment 406 of FIG. 4. It should be understood that each of the application environments 518, 522 can include components corresponding to all of the components contained in the application environment 406 of FIG. 4, although those components are not shown in FIG. 5.

A remote computing environment 524 can correspond to the remote computing environment 428 of FIG. 4, and include corresponding components: anonymized access data 526, an access data warehouse 528, a remote bus 530, and at least one analytics package 532. The application environment 504 can be commutatively coupled through its local bus 514 and a network 534 to the remote bus 530. The platform components included in the application environment 504 can communicate with the access data warehouse 528 and the at least one analytics package 532 through the local bus 514, the network 534, and the remote bus 530.

Similarly, each of the further application environments 518, 522 can be communicatively coupled through its local bus and the network 534 to the remote bus 530. The platform components contained in each of the further application environments 518, 522 can communicate with the access data warehouse 528 and the at least one analytics package 532 through that application environment's local bus, the network 534, and the remote bus 530. An analysis performed for organization 502 by the at least one analytics package 532 can selectively identify at least one abnormal usage pattern in the usage of the associated application server 506. The at least one analytics package 532 can use the results of the analysis to generate at least one protective measure for the application server 506.

Similarly, an analysis performed by the at least one analytics package 532 for any particular one of the further organizations 516, 520 can identify abnormal usage patterns in the usage of the application server associated with that particular organization. The at least one analytics package 532 can use the results of the analysis to generate protective measures for the application server associated with that particular organization. The anonymized access data 526 associated with the organizations 502, 516, 520 are aggregated in the access data warehouse 528 in such a way that the at least one analytics package 532 can utilize all of the anonymized access data 526 in an analysis performed for any one of the organizations 502, 516, 520.

When the at least one analytics package 532 performs an analysis for the organization 502, only that part of the anonymized access data 526 associated with organization 502 can be reidentified, because the at least one analytics package 532 has access only to the identifying keys 512 associated with the organization 502, and not to the identifying keys associated with the further organizations 516, 520. Similarly, when the at least one analytics package 532 performs an analysis for any particular one of the further organizations 516, 520, only that part of the anonymized access data 526 associated with that particular further organization can be reidentified. Thus, the analytics package 532 can utilize the anonymized access data 526 associated with any one of the organizations 502, 516, 520 without compromising the security of any other organization.

Figure 6:
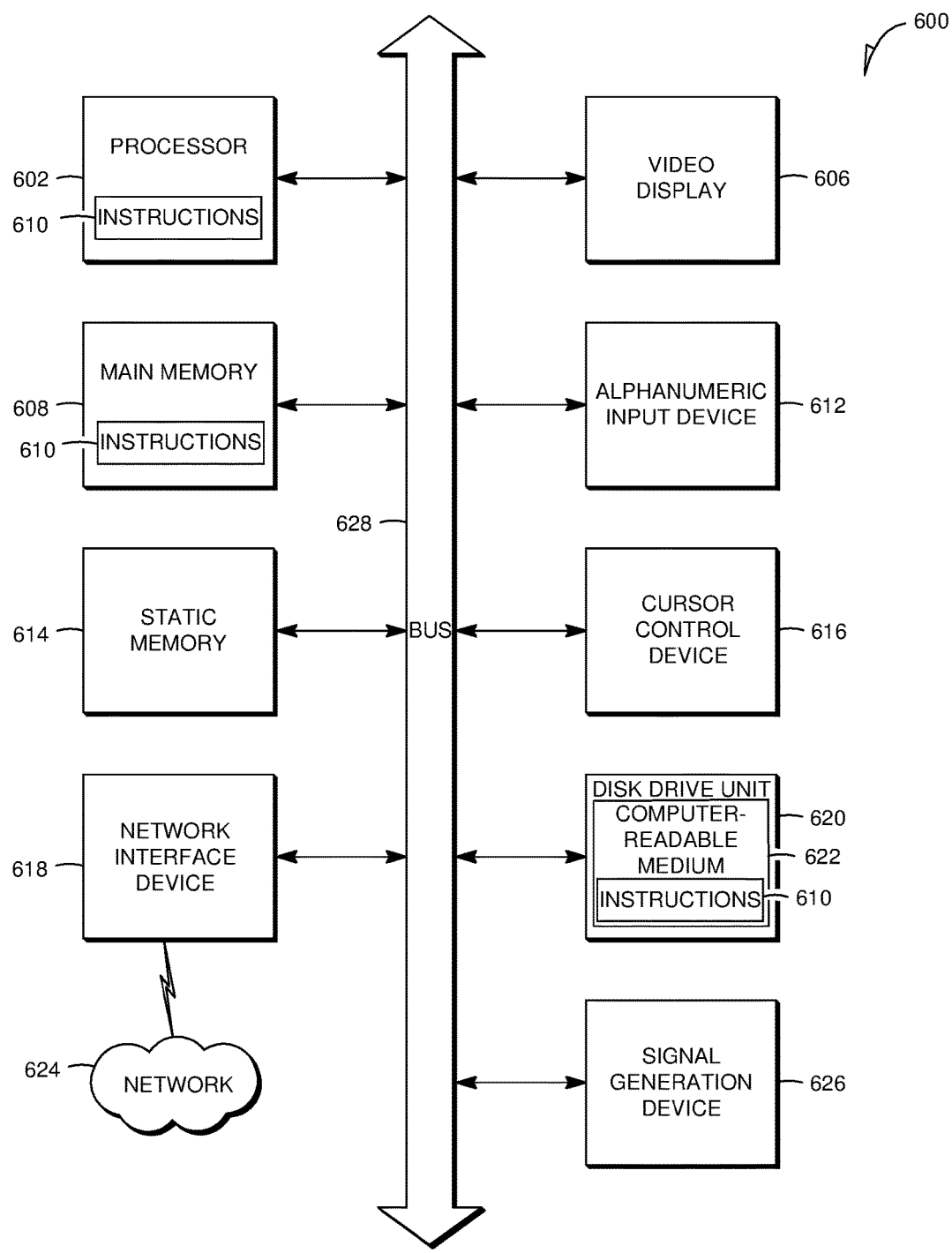
FIG. 6 is a diagrammatic representation of an exemplary machine in the form of a computer system, within which a set of instructions for causing the machine to perform any one or more of the methodologies discussed herein may be executed.

FIG. 6 is a diagrammatic representation of an exemplary machine in the form of a computer system 600, within which a set of instructions for causing the machine to perform any one or more of the methodologies discussed herein may be executed. In various exemplary embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor or multiple processors 602 (e.g., a central processing unit (CPU), a graphics processing unit (GPU), or both), and a main memory 608 and static memory 614, which communicate with each other via a bus 628. The computer system 600 may further include a video display 606 (e.g., a liquid crystal display (LCD)). The computer system 600 may also include an alphanumeric input device 612 (e.g., a keyboard), a cursor control device 616 (e.g., a mouse), a voice recognition or biometric verification unit (not shown), a disk drive unit 620, a signal generation device 626 (e.g., a speaker) and a network interface device 618. The computer system 600 may further include a data encryption module (not shown) to encrypt data.

The disk drive unit 620 includes a computer-readable medium 622 on which is stored one or more sets of instructions and data structures (e.g., instructions 610) embodying or utilizing any one or more of the methodologies or functions described herein. The instructions 610 may also reside, completely or at least partially, within the main memory 608 and/or within the processors 602 during execution thereof by the computer system 600. The main memory 608 and the processors 602 may also constitute machine-readable media.

The instructions 610 may further be transmitted or received over a network 624 via the network interface device 618 utilizing any one of a number of well-known transfer protocols (e.g., HTTP).

While the computer-readable medium 622 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like.

The exemplary embodiments described herein may be implemented in an operating environment comprising software installed on a computer, in hardware, or in a combination of software and hardware.

Although embodiments have been described with reference to specific exemplary embodiments, it will be evident that various modifications and changes may be made to these embodiments without departing from the broader spirit and scope of the system and method described herein. Accordingly, the specification and drawings are to be regarded in an illustrative rather than a restrictive sense.

The invention claimed is:

1. A computer-implemented method for preventing unauthorized access to an application server, the method comprising:
   collecting, by the application server, access data, the access data including instances of authorized requests for data fulfilled by the application server from users of a first organization and an identifying characteristic of each requested data;
   anonymizing, by an anonymizing module, the access data to create anonymized access data;

creating at least one identifying key for the anonymized access data, the at least one identifying key being operable to match a datum of the anonymized access data to a respective user of the users of the first organization;

saving the at least one identifying key at a secure location associated with the first organization;

storing the anonymized access data in an access data warehouse, the access data warehouse additionally storing another anonymized access data associated with a second organization; and performing an analysis on the stored anonymized access data using at least one analytic criterion, the stored anonymized access data being separated from the another anonymized access data using the at least one identifying key.

2. The method of claim 1, wherein the access data includes at least one of a request, a log-in, a user location, a user name, a role, a content, a header of a data package, a data attribute, an activity associated with content, an activity associated with a type of user, a multi-factor authentication activity, a user identification (ID), an IP address, a browser type, a date, a time, a login page, a portal content, an employee ID, an action taken, a script run, and a response.

3. The method of claim 1, wherein the access data is collected by a plug-in installed on a web server.

4. The method of claim 1, further comprising formatting the anonymized access data in the access data warehouse prior to the analysis.

5. The method of claim 1, wherein the at least one analytic criterion includes a data mining algorithm.

6. The method of claim 1, wherein the analysis includes comparing the anonymized access data to reference access data.

7. The method of claim 1, wherein the access data warehouse is located in a cloud computing environment.

8. The method of claim 7, wherein the analysis occurs in the cloud computing environment.

9. The method of claim 1, further comprising selectively identifying, based on the analysis, at least one abnormal usage pattern.

10. The method of claim 9, wherein the at least one abnormal usage pattern includes at least one of a security breach, a threat, at least two segregated users interacting in a single online process, a payee and a payer accessing the application server from the same IP address, at least two users accessing from different locations with the same credentials, a failed login request, abnormally formatted data, and an attack from an IP address.

11. The method of claim 9, further comprising generating at least one protective measure based on the identification of the at least one abnormal usage pattern, the at least one protective measure including blocking access by a user of the users of the first organization to the application server.

12. The method of claim 11, wherein the at least one protective measure includes at least one of automatically modifying access, issuing an alert, providing a report, requiring multi-factor authentication, displaying a message, restricting access, blocking access, blocking an Internet Protocol (IP) address, blacklisting the IP address, and generating an ad hoc query result.

13. The method of claim 9, further comprising predicting at least one future event based on the least one abnormal usage pattern.

14. The method of claim 1, further comprising aggregating anonymized access data in the access data warehouse with further anonymized access data associated with further organizations.

15. The method of claim 1, wherein
the performing the analysis is on the stored anonymized access data and the another anonymized access data, and
the at least one identifying key reidentifies the anonymized access data and does not reidentify the another anonymized access data.

16. An unauthorized access prevention platform comprising:
a plug-in installed on a web server associated with a first organization, the plug-in being operable to collect access data, the access data including instances of authorized requests for data fulfilled by an application server from users of the first organization and an identifying characteristic of each requested data;
a processor;
a memory coupled to the processor, the memory storing instructions executable by the processor to:
anonymize the access data to create anonymized access data; and
create at least one identifying key for the anonymized access data, the at least one identifying key being operable to match a datum of the anonymized access data to a respective user of the users of the first organization;
a secure location associated with the first organization, the secure location securely saving the at least one identifying key at the secure location associated with the first organization;
an access data warehouse storing the anonymized access data, the access data warehouse additionally storing another anonymized access data associated with a second organization; and
at least one analytics package analyzing the stored anonymized access data, the stored anonymized access data being separated from the another anonymized access data using the at least one identifying key.

17. The unauthorized access prevention platform of claim 16, wherein the at least one analytics package further selectively identifies at least one abnormal usage pattern.

18. The unauthorized access prevention platform of claim 17, wherein the at least one analytics package further generates at least one protective measure based on the identification of the at least one abnormal usage pattern, the at least one protective measure including blocking access by a user of the users of the first organization to the application server.

19. The unauthorized access prevention platform of claim 18, wherein the at least one protective measure includes at least one of automatically modifying access, issuing an alert, providing a report, requiring multi-factor authentication, displaying a message, restricting access, blocking access, blocking an Internet Protocol (IP) address, blacklisting the IP address, and generating an ad hoc query result.

20. The unauthorized access prevention platform of claim 16, wherein the anonymized access data in the access data warehouse is aggregated with further anonymized access data associated with further organizations.

21. A non-transitory computer-readable storage medium having embodied thereon at least one program, the program being executable by a processor to perform a method for preventing unauthorized access to an application server, the method comprising:

collecting access data, the access data including instances of authorized requests for data fulfilled by the application server from users of a first organization and an identifying characteristic of each requested data;

anonymizing the access data to create anonymized access data;

creating at least one identifying key for the anonymized access data, the at least one identifying key being operable to match a datum of the anonymized access data to a respective user of the users of the first organization;

saving the at least one identifying key at a secure location associated with the first organization;

storing the anonymized access data in an access data warehouse, the access data warehouse additionally storing another anonymized access data associated with a second organization; and performing an analysis on the stored anonymized access data using at least one analytic criterion, the stored anonymized access data being separated from the another anonymized access data using the at least one identifying key.

\* \* \* \* \*